Nov. 17, 1931.    R. MUELLER    1,832,723
ADJUSTABLE COMBINATION MIXING FAUCET
Filed Dec. 31, 1925    2 Sheets-Sheet 2
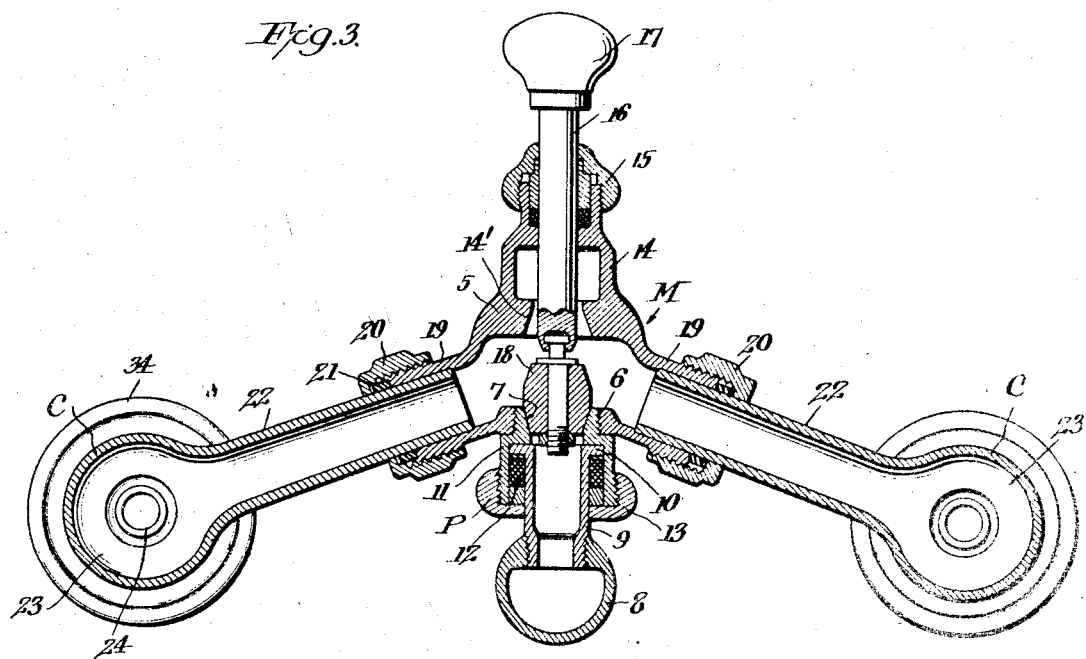
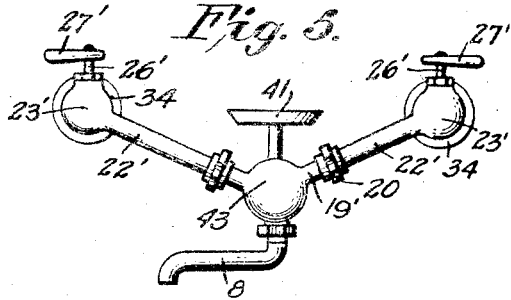
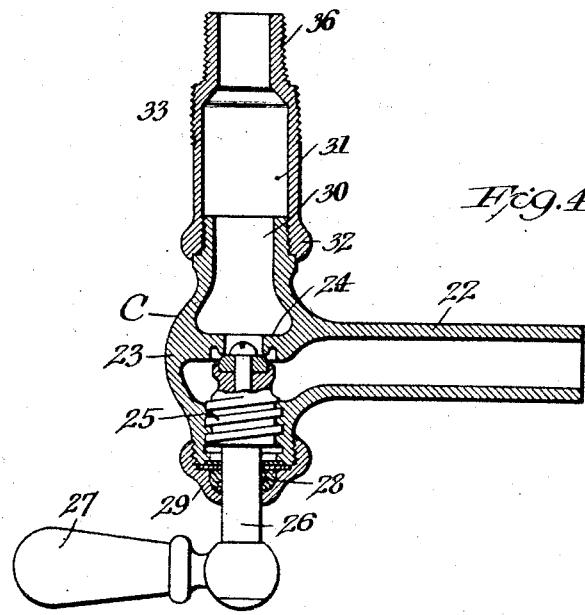
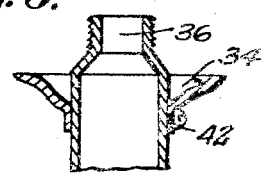
Inventor
Robert Mueller
Attorneys Patented Nov. 17, 1931

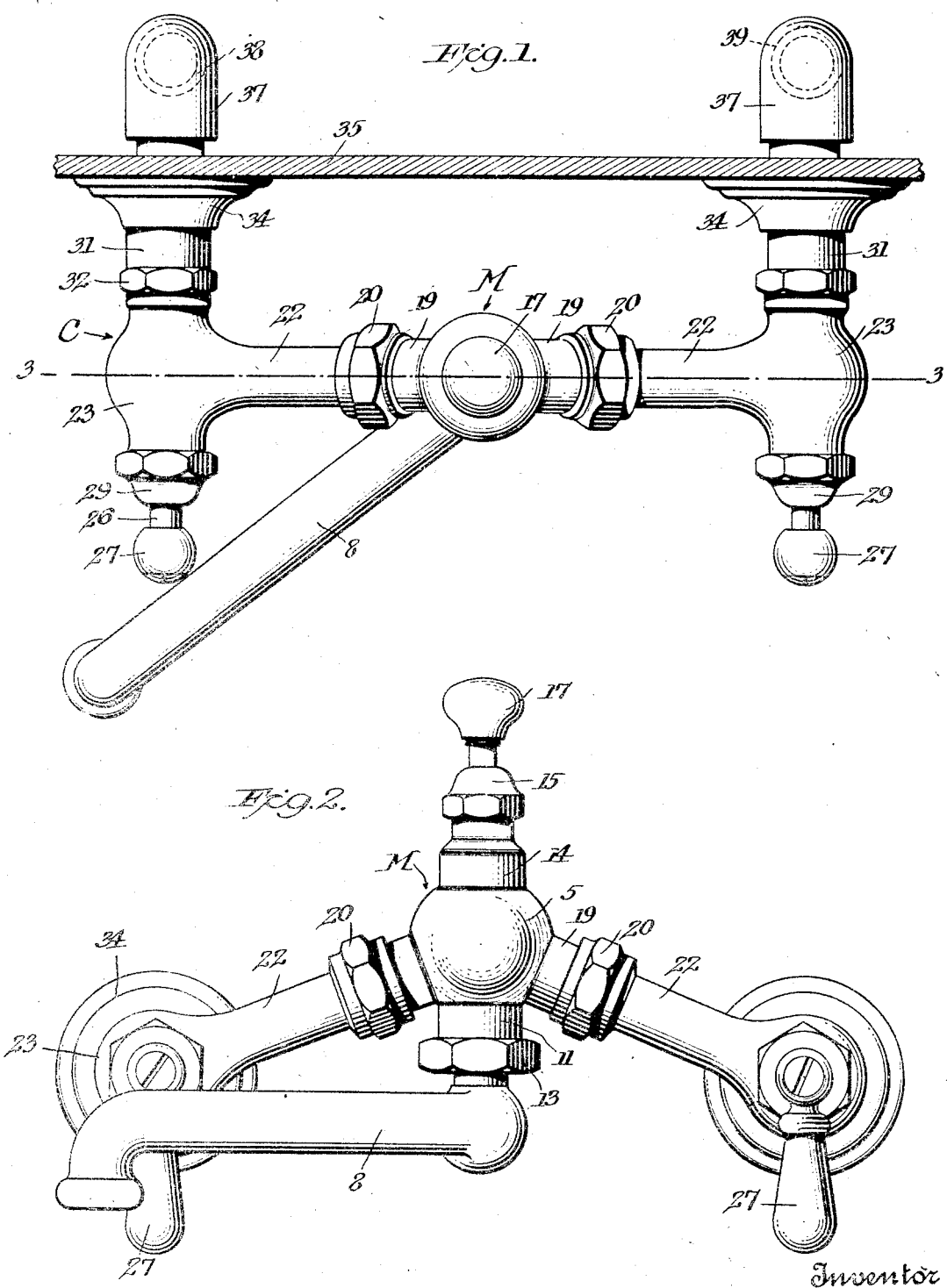

1,832,723

UNITED STATES PATENT OFFICE

ROBERT MUELLER, OF DECATUR, ILLINOIS, ASSIGNOR, BY MESNE ASSIGNMENTS, TO MUELLER CO., OF DECATUR, ILLINOIS, A CORPORATION OF ILLINOIS

ADJUSTABLE COMBINATION MIXING FAUCET

Application filed December 31, 1925. Serial No. 78,650.

This invention relates to new and useful improvements in combination mixing faucets of the type in which hot and cold water are delivered thereto to be drawn off from a common outlet at the desired temperature.

An important object of the invention resides in the production of a faucet of this type having means entirely within the faucet itself for permitting the inlets thereof to be adjusted relatively to facilitate connection of the same with supply pipes arranged different distances between centers.

Another important object is to provide a faucet of the above type, having its inlets so arranged with respect to the main body or mixing chamber of the faucet that the mixing chamber cannot be rotated or swung upon the inlets, and still the latter can be relatively adjusted.

A further object of the invention resides in the construction of the valved inlets of the faucet separate from the mixing chamber thereof so that these inlets may be made standard so that the manufacturer can make up large quantities of the separate valved inlets and hold them in stock for either replacement or assemblage with mixing chambers of different types, and styles, it being appreciated that in the case of replacements, a damaged single valved inlet can be replaced at a much smaller cost than when the inlets and mixing chamber are made integral and the whole fixture must be replaced because of one damaged valve.

Also, since the valved inlets are manufactured as separate parts of the mixing chamber, testing of the valves is made simpler inasmuch as a single valve can be tested easier than a fixture involving more than one valve.

Still another object of the invention resides in the location of the means permitting relative adjustment of the inlets on the low pressure sides of the inlet valves, thereby minimizing the possibility of leakages through said means as well as permitting the mixing faucet to be arranged closer to the wall with which it is to be associated.

Another object of the invention resides in the production of a mixing faucet in which the inlet valves do not form integral parts of the mixing chamber as is customary, but are located outside of the same to increase the capacity of the mixing chamber.

It is a further object of this invention to arrange the parts thereof so that water will not stand in the fixture between the inlet valves and the outlet of the mixing chamber, thereby eliminating sweating and consequent discoloration of the faucet.

Other objects of the invention will become apparent during the course of the following description:

In the drawings wherein for the purpose of illustration, are shown preferred embodiments of the invention, and wherein like numerals are employed to designate like parts throughout the several views:

Figure 1 is a top plan of the improved combination mixing faucet installed.

Figure 2 is a front elevation of the same.

Figure 3 is a longitudinal vertical section of the faucet taken on the line 3—3 of Figure 1.

Figure 4 is an enlarged longitudinal section of one of the valved inlets of the faucet.

Figure 5 is an elevation of a modified form of the invention, and

Figure 6 is an enlarged section of a detail illustrating the modified manner of securing the box flange in place upon the inlet.

It is well known to the plumbing trade in general that difficulties are experienced in the installation of combination mixing faucets of the old type wherein the inlets thereof are integrally connected with the mixing chamber, due to the fact that no relative adjustment between the inlets can be made in order to make the necessary connections with supply pipes, which are not always installed by plumbers with the same distance between centers. This necessitates the utilization of special connections between the inlets of the mixing faucet and the supply pipes, as is well known by those experienced in the art.

It is, therefore, one of the main objects of this invention to eliminate these difficulties by constructing a combination mixing faucet having its essential parts arranged, constructed, and so connected that they may be adjusted to overcome the foregoing objections.

A very important feature of this invention is that the inlets of the faucet have sliding connection with the mixing chamber and are non-aligned or disposed in inwardly converging relationship with the mixing chamber so that the latter cannot be turned or rotated upon its inlets, yet these inlets can be relatively adjusted to be connected with supply pipes arranged at different distances between centers.

Referring now more in detail to the specific construction of the faucet, the letter M designates the mixing chamber part of the faucet in general, while the letter C indicates in general the valved inlet portions of the faucet which are slip jointed into the mixing chamber to permit their relative adjustment toward and away from each other, and are arranged in inwardly converging relationship to prevent rotary movement of the mixing chamber thereon. This mixing chamber comprises a valve casing 5 having in its bottom wall, a screw threaded opening 6 to receive a reduced threaded nipple of a combined packing and swivel connection P, which serves as a valve seat 7, and also a swivel mounting for the common discharge spout 8. In the present illustration, this spout is provided with an angularly disposed extension 9 at its inner end, which extension has its outer end flanged as at 10 to fit within the enlarged portion 11 of the gland and swivel connection, a suitable packing 12 being received within the gland and held in engagement with the flange 10 by means of a packing nut 13.

The top of the mixing chamber in the present illustration is equipped with an upwardly extending valve chamber 14 having formed therein a valve seat 14' and terminating at its upper end in a packing gland indicated in its entirety by the numeral 15, and through which extends vertically the shank 16 of a mixing chamber valve. It will, of course, be understood that the chamber 14 has a suitable outlet to which may be attached a spraying attachment or any other type of outlet device. The upper end of this shank is equipped with a knob or handle 17, while the lower end of the shank 16 is swivelly connected to a double valve head 18, which is adapted when engaging the seat 7 to cut off the flow of water through the discharge spout 8, and when engaging the seat 14', to cut off the flow to chamber 14.

The mixing chamber casing 5 is provided with a pair of non-aligned tubular extensions 19 which are arranged in outwardly and downwardly diverging relationship as clearly shown in Figure 3. These extensions 19 communicate with the interior of the mixing chamber as shown, and terminate at their outer ends in exteriorly threaded portions to receive nuts 20 adapted to compress their respective packings 21 against the angularly disposed tubular arms 22 constituting parts of the valved inlets C. The free ends of these arms 22 are adapted to telescope within the extensions 19, and due to this construction, are adjustably connected with the mixing chamber.

As shown best in Figure 4, the arms 22 extend preferably at right angles to the valve casings 23 and communicate with the interior thereof on the low pressure side of a valve seat 24. As shown here, the valve adapted to seat upon the seat 24 when closed, comprises the well known type of screw cock 25 having threaded connection with the valve casing, and provided with the usual shank 26 and operating handle 27. As here shown, the handles are extended forwardly of the faucet with their shanks in axial alignment with the valve casings, but it is to be understood that the valves and handles can be arranged perpendicularly of the valve casing so that the handles will be disposed above the valve casings as shown in Figure 5, or any other suitable arrangement of these handles may be made within the scope of this invention.

However, it is to be understood that any type of stop cock may be employed either in the valved inlets or the mixing chamber, and furthermore the mixing chamber may be valveless and plain or equipped with any of the adjuncts common in such faucets such as a soap dish 41 or the like as shown in Figure 5.

The shanks 26 of the valves 25 are suitably packed with gaskets and packings indicated by the numeral 28, and a packing nut 29 surrounds each shank 26 and is secured to its respective valve casing to retain the packing in place.

The opposite end of the valve casing on the high pressure side of the valve seat terminates in an exteriorly threaded reduced extension 30 upon which is threaded a detachable shank sleeve 31 which is provided at its end nearest the valve casing with an exterior hexagon nut 32. The opposite end of the sleeve is exteriorly screw threaded as at 33 to receive an adjustable box flange 34 which is adapted to be screwed up into engagement with the wall 35 with which the faucet is to be associated. The screw threaded end 33 of the shank may be plain and the box flange may be secured thereto by means of passing a set screw 42 through the flange to engage the shank as shown in Figure 6. The outer end of the sleeve 31 terminates in a reduced exteriorly threaded nipple 36 adapted to receive an elbow 37 which is also connected with its respective supply pipe shown in dotted lines as at 38 and 39.

As shown in Figure 3, the arms 22 of the valved inlets are shown as being inclined upwardly in inwardly converging relationship, but it is to be understood that if desired, these arms may be disposed in downwardly inclined and converging relationship as shown in Figure 5 so as to be disposed below a horizontal plane passed through the centers of the valved inlets. In this manner the mixing chamber M will be disposed lower than the valved inlets, and water rapidly drained from the arms 22 and mixing chamber when the valve 18 is open or when no valve is used in connection with the mixing chamber. When the arms 22 are to be arranged in downwardly inclined relationship as shown in Figure 5, it will, of course, be necessary to construct the mixing chamber so that the angular extensions 19 thereof are inclined upwardly instead of downwardly as shown in the full lines.

In Figure 5, the mixing chamber 43 is illustrated with a soap dish 41 associated therewith instead of a valve 18 shown in the other figures of the drawings, and this mixing chamber is provided with upwardly and outwardly diverging angular extensions 19' for slip-joint connection with the angular extensions 22' of valved inlet pipes 23'. Instead of the stems of the valves being arranged coaxially with the valved inlet pipes 23', as shown in Figure 4, the valve stems 26' are disposed at right angles to the axis of the pipes 23' and extend vertically as shown in Figure 5 to be equipped with valve operating handles 27' arranged above the valved inlet pipes 23' instead of being located out in front of these inlet pipes as shown in the other modification of the invention.

To install the improved combination mixing faucet which has self contained means for relatively adjusting the valved inlets, the arms 22 of these inlets by reason of their slip joint connection with the mixing chamber are slid either inwardly or outwardly of the extensions 19 so that the valved inlets C are disposed the same distance between the centers, as the supply pipes 38 and 39, whereby the nipples 36 can be passed through the usual openings in the wall or sink back and connected to the supply pipes by means of the elbows 37 in the customary manner.

Since the arms 22 of the valved inlets are arranged in inclined relationship as shown, and out of axial alignment, it will be obvious that the mixing chamber cannot be rotated or turned upon these arms 22, and consequently this mixing chamber will always be held rigidly in its proper installed position.

Due to the fact that the valved inlets C are made up as entirely independent parts separate from the mixing chamber, and can be readily detached from or attached to the mixing chamber, it will be apparent that the cost of replacing the valved inlets as well as the mixing chambers, is reduced to a minimum, and that different types or styles of mixing chambers and valved inlets can be combined as desired to make up a complete mixing faucet. Due to the fact that the slip joints are arranged between the mixing chamber and the inlet valves 25 on the low pressure sides of these valves, it will be apparent that high pressure is not exerted against these slip joints when the valves 25 are closed, thereby minimizing the possibility of leakages.

It is to be understood that such changes and modifications as come within the purview of one skilled in the art may be made without departing from the spirit of the invention or the scope of the appended claims.

I claim:

1. In a combination mixing faucet, the combination with a mixing chamber, of inclined converging inlets for the faucet having slip joint connections with the mixing chamber and forming the sole support thereof while preventing turning movement of the mixing chamber on said inlets.

2. A unitary combination mixing faucet fixture comprising a mixing chamber, and inlets comprising essential parts of said unitary faucet fixture and having slip joint connections with the mixing chamber to permit longitudinal adjustment therebetween, said inlets being arranged with respect to each other to form the sole support of said mixing chamber and to prevent relative rotary movement of the mixing chamber.

3. A combination mixing faucet comprising a mixing chamber, inlets for the faucet having slip joint connections with the mixing chamber and arranged out of alignment with each other to form the sole support of said mixing chamber and to prevent turning of said mixing chamber on said inlets as an axis.

4. A combination mixing faucet comprising a mixing chamber, and inlets comprising essential parts of the faucet and having slip joint connections with the mixing chamber and arranged in inclined relationship to form the sole support of said mixing chamber and to prevent turning of said mixing chamber on said inlets as an axis.

5. A combination mixing faucet comprising a mixing chamber, valved inlets comprising parts of the faucet and having slip joint connections with the mixing chamber and arranged to converge in inclined relation inwardly toward the mixing chamber to form the sole support of said mixing chamber and to prevent turning of said mixing chamber on said inlets as an axis.

6. A combination mixing faucet comprising a mixing chamber having a pair of outwardly diverging extensions, and valved inlets having slip joint connections with said extensions whereby said mixing chamber is adjustably mounted on said inlets while being prevented from turning movement thereon.

7. A combination mixing faucet comprising a mixing chamber and a pair of valved inlets each having an angularly disposed arm located on the low pressure side of its respective valve, said arms having slip joint connections with the mixing chamber and arranged with respect to each other to prevent turning of said mixing chamber on said inlets while forming the sole support of said mixing chamber.

8. A combination mixing faucet comprising a mixing chamber, and a pair of non-aligned inlets having slip joint connections with the mixing chamber to form the sole support of said mixing chamber and to prevent turning movement of said mixing chamber upon said inlets.

9. In a combination mixing faucet, the combination with faucet inlets, a mixing chamber supported solely by said inlets and having sliding connection therewith, said inlets being relatively arranged to prevent turning movement of the mixing chamber on said inlets.

10. A combination mixing faucet comprising a mixing chamber, valved inlets constituting essential parts of a faucet and being slidably connected to the mixing chamber to form the sole support of the same, and to permit longitudinal adjustment between the mixing chamber and said inlets, said valved inlets being relatively arranged to prevent turning movement of said mixing chamber on said inlets.

11. In combination, a coupling member, and a pair of converging pipe members adapted to have their outer ends fixed and their inner ends having slip joint connections with said coupling member whereby to form the sole support of said coupling member and to prevent it from turning on said pipe members as an axis.

12. A mixing faucet comprising valved inlets, a mixing chamber adjustably connecting the same whereby they can be moved to and from each other, and the means connecting said mixing chamber and inlets being arranged relative to each other so as to form the sole support of said mixing chamber and to prevent turning movement of said mixing chamber relative to said inlets.

13. A unitary mixing fixture comprising valved inlets adapted to be fixedly mounted after installation and having branches arranged in inclined relationship, a mixing chamber adjustably connected to said branches whereby said inlets can be relatively adjusted before installation, and said branches forming the sole support of said mixing chamber and being inclined to prevent turning movement of said chamber upon said inlets after installation.

14. A mixing faucet comprising valved inlets adapted to be mounted on a basin or the like, a mixing chamber having slip joint connections with said inlets whereby the latter can be moved to and from each other, and said connections being inclined and arranged in the same vertical plane passing through said connections.

15. A mixing faucet comprising valved inlets, a mixing chamber adjustably connecting the same whereby they can be moved to and from each other, the connections between said mixing chamber and inlets being arranged in converging relationship and in a vertical plane passing through said connections.

16. A combination faucet comprising a mixing chamber, and valved inlets each having an angularly disposed arm having a slip-joint connection with said mixing chamber and arranged with respect to each other to prevent turning movement of said mixing chamber on said inlets and to form the sole support of said mixing chamber.

17. A combination mixing faucet comprising a mixing chamber, and a pair of valved inlets each having an arm having slip-joint connection with the mixing chamber and arranged in inclined converging relation to each other to form the sole support of said mixing chamber and to prevent turning movement of said mixing chamber on said inlets.

In testimony whereof I have hereunto set my hand.

ROBERT MUELLER.